US010633045B2

(12) United States Patent
Komuro et al.

(10) Patent No.: US 10,633,045 B2
(45) Date of Patent: Apr. 28, 2020

(54) ROBOT AND CONTROL DEVICE OF THE ROBOT

(71) Applicant: HONDA MOTOR CO., LTD., Tokyo (JP)

(72) Inventors: Satoshi Komuro, Saitama (JP); Itoshi Naramura, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 294 days.

(21) Appl. No.: 15/922,183

(22) Filed: Mar. 15, 2018

(65) Prior Publication Data
US 2018/0281881 A1 Oct. 4, 2018

(30) Foreign Application Priority Data
Mar. 29, 2017 (JP) ................................ 2017-064459

(51) Int. Cl.
*G06T 7/20* (2017.01)
*B62D 57/032* (2006.01)
(Continued)

(52) U.S. Cl.
CPC .......... *B62D 57/032* (2013.01); *B25J 9/1605* (2013.01); *B25J 9/1697* (2013.01); *B25J 13/085* (2013.01);
(Continued)

(58) Field of Classification Search
CPC .. G06T 7/75; G06T 7/242; G06T 7/73; G06T 7/20; G06T 2207/10016; B25J 9/1605;
(Continued)

(56) References Cited

U.S. PATENT DOCUMENTS 6,317,652 B1 * 11/2001 Osada ................... B25J 19/023
318/568.1
6,438,454 B1 * 8/2002 Kuroki ................... B25J 13/003
700/108
(Continued)

FOREIGN PATENT DOCUMENTS

| JP | 4276624 | 3/2009 |
|---|---|---|
| WO | 2004/052597 | 6/2004 |
| WO | 2015/087504 | 6/2015 |

OTHER PUBLICATIONS

Kumar et al., Robust gesture detection and recognition using dynamic time warping and multi-class probability estimates, 2013, IEEE, p. 30-36 (Year: 2013).*
(Continued)

*Primary Examiner* — McDieunel Marc
(74) *Attorney, Agent, or Firm* — Rankin, Hill & Clark LLP

(57) ABSTRACT

A robot and its control device capable of improving recognition accuracy of a position and posture of a functional body such as a hand with respect to an object to thereby attain improved stability of the operation involving a change in position/posture of its body are provided. In a case where the magnitude of a deviation $\Delta\phi$ of an angle $\phi$ made by two reference vectors $U_1$ and $U_2$, representing a manner in which a structure W extends in a camera coordinate system and in a hand coordinate system, respectively, with respect to a reference angle $\phi_0$ is greater than a threshold value $\epsilon$, the probability that the state of interaction between the hand 13 (functional body) and the structure W is divergent from a desired state is high.

4 Claims, 7 Drawing Sheets

(51) Int. Cl.
  *B25J 13/08* (2006.01)
  *B25J 9/16* (2006.01)
  *G05D 1/10* (2006.01)
  *G06T 7/73* (2017.01)
  *G06T 7/246* (2017.01)

(52) U.S. Cl.
  CPC .............. *B25J 13/089* (2013.01); *G05D 1/10* (2013.01); *G06T 7/246* (2017.01); *G06T 7/73* (2017.01); *G06T 7/20* (2013.01); *G06T 7/75* (2017.01); *G06T 2207/10016* (2013.01)

(58) Field of Classification Search
  CPC ..... B25J 13/085; B25J 13/089; B62D 57/032; G05D 1/10
  See application file for complete search history.

(56) References Cited

U.S. PATENT DOCUMENTS

| | | | | |
|---|---|---|---|---|
| 6,556,892 B2* | 4/2003 | Kuroki | ................ | G05B 19/00 700/108 |
| 6,889,118 B2* | 5/2005 | Murray, IV | ............. | B25J 9/161 318/568.11 |
| 6,901,313 B2* | 5/2005 | Mori | ................ | B62D 57/032 700/245 |
| 6,904,334 B2* | 6/2005 | Asano | ................ | B25J 13/003 219/130.01 |
| 6,980,889 B2* | 12/2005 | Ito | ................ | G06N 3/08 700/245 |
| 6,999,851 B2* | 2/2006 | Kato | ................ | G06N 3/008 318/568.1 |
| 7,054,718 B2* | 5/2006 | Miyamoto | ............ | B62D 57/032 180/8.1 |
| 7,099,747 B2* | 8/2006 | Mikami | ................ | G06N 3/008 180/8.1 |
| 7,127,326 B2* | 10/2006 | Lewis | ................ | B25J 13/081 700/258 |
| 7,133,070 B2* | 11/2006 | Wheeler | ................ | H04N 1/40 348/223.1 |
| 7,269,477 B2* | 9/2007 | Fukuchi | ............ | H04L 29/06027 375/240.1 |
| 7,269,478 B2* | 9/2007 | Fukuchi | ............ | H04L 29/06027 375/240.1 |
| 7,269,480 B2* | 9/2007 | Hashimoto | ............ | G06N 3/004 318/568.11 |
| 7,302,312 B2* | 11/2007 | Murray, IV | ............. | B25J 9/161 318/568.11 |
| 7,330,775 B2* | 2/2008 | Orita | ................ | B62D 57/032 318/568.11 |
| 7,386,364 B2* | 6/2008 | Mikami | ................ | B62D 57/02 318/443 |
| 7,805,218 B2* | 9/2010 | Nagasaka | ............ | B62D 57/032 318/568.12 |
| 7,881,824 B2* | 2/2011 | Nagasaka | ............... | B25J 13/085 700/245 |
| 8,340,817 B2* | 12/2012 | Honda | ................ | B25J 5/00 700/245 |
| 8,386,076 B2* | 2/2013 | Honda | ................ | B62D 57/032 180/8.5 |
| 8,463,433 B2* | 6/2013 | Nagasaka | ............... | B25J 13/084 318/568.16 |
| 9,073,209 B2* | 7/2015 | Lee | ................ | B25J 9/162 |
| 9,957,003 B2* | 5/2018 | Kamioka | ............ | B62D 57/032 |
| 2011/0060248 A1* | 3/2011 | Ishida | ................ | A61B 5/1113 600/587 |

OTHER PUBLICATIONS

Schultje et al., Comparison of Trajectory Generation Methods for a Human-Robot Interface based on Motion Tracking in the Int2Bot, 2014, IEEE, p. 710-715 (Year: 2014).*

Silva et al., Towards Force Interaction Control of Biped Walking Robots, 2004, IEEE, p. 2568-2573 (Year: 2004).*

Zhang et al., Fast Human Whole Body Motion Imitation Algorithm for Humanoid Robots, 2016, IEEE, p. 1430-1435 (Year: 2016).*

* cited by examiner

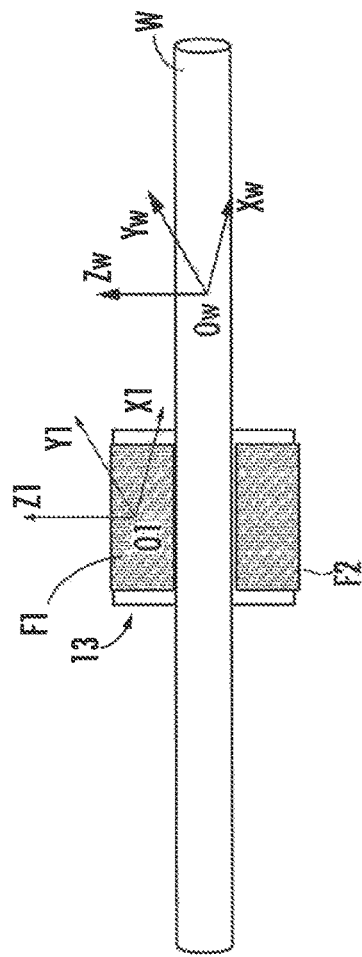
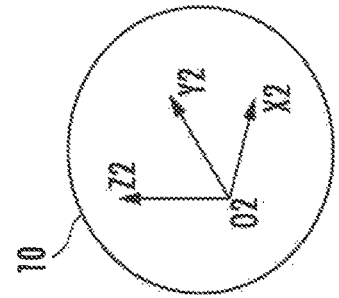
FIG.6A
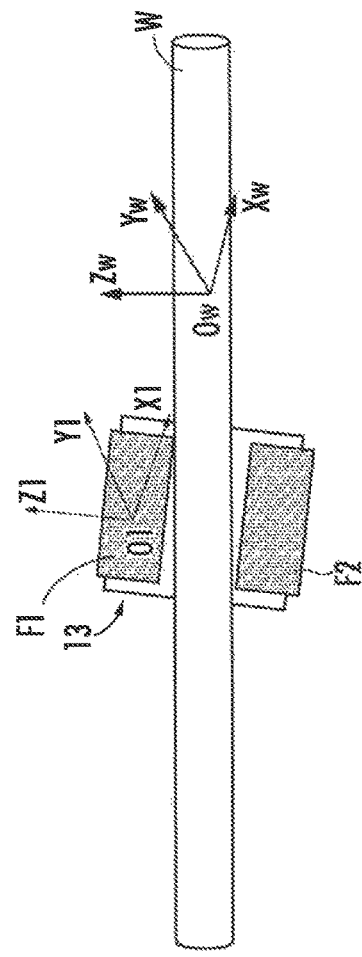
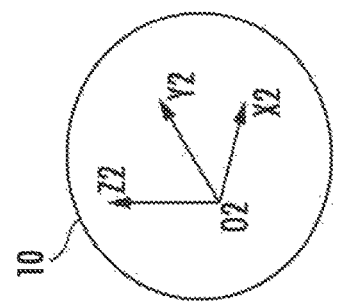
FIG.6B

ROBOT AND CONTROL DEVICE OF THE ROBOT

BACKGROUND OF THE INVENTION

Field of the Invention

The present invention relates to a technique of controlling a robot.

Description of the Related Art

A technique of judging the ease of movement of a robot by regarding an area in which the robot may interfere with a structure or the like as a warning area has been proposed (see Japanese Patent No. 4276624). A technique of causing a robot to travel while contacting a structure has been proposed (see International Patent Publication No. WO2015/087504).

SUMMARY OF THE INVENTION

In the case where a robot grasps an object with its hand having a plurality of finger mechanisms, however, the object grasping state is uncertain even though an output from a six-axis force sensor disposed on the hand may show a state of equilibrium. When an output from the six-axis force sensor indicates the equilibrium state, a control device which has received the output recognizes that, as shown in FIG. 6A for example, the robot hand 13 is grasping an object W so that a pair of grasping mechanisms F1 and F2 of the robot have their contact surfaces thoroughly abutted against the object W.

In contrast, the robot hand 13 may actually be grasping the object W in a state, as shown in FIG. 6B, where its pair of grasping mechanisms F1 and F2 have their contact surfaces only partially abutted against the object W. Thus, if the robot body 10 is moved such that the position/posture (meaning at least one of the position and posture; the same applies hereinafter) of the body coordinate system ($X_2$, $Y_2$, $Z_2$) in the world coordinate system is changed in accordance with the recognition results of the position and posture of the hand coordinate system ($X_1$, $Y_1$, $Z_1$) relative to the object coordinate system ($X_W$, $Y_W$, $Z_W$), the operation of the body 10 may become unstable (see FIG 7B). Particularly in the case where the object is a structure such as a part of a handrail or ladder and the robot moves its body by operations of a plurality of legs or other moving mechanisms while grasping the structure with the hand, the robot may lose overall balance.

In view of the foregoing, it is an object of the present invention to provide a robot and a control device of the robot that can improve the recognition accuracy of the position/posture of a functional body such as a hand with respect to an object, to attain improved stability of the operation involving a change in position/posture of the body.

The present invention relates to a robot and its control device, the robot including a body, a first limb movably connected to the body, a functional body movably connected to the first limb, a second limb movably connected to the body, and an image capturing device having a fixed position and posture relative to the functional body.

The control device includes: a storage device that stores environmental information representing a manner in which a structure is arranged in a world coordinate system; an operation generating element that generates an operation of the robot, the operation including operations of the first limb and the functional body that cause the functional body to interact with the structure, the arrangement manner of which is represented by the environmental information, and an operation of the second limb that causes at least one of a position and a posture of the body to be changed; a state detecting element that detects a state of interaction between the functional body and the structure; a calculating element that calculates, based on a captured image acquired by the image capturing device, a first reference vector and a second reference vector that represent a manner in which the structure extends in an image capturing device coordinate system and in a functional body coordinate system, respectively; and a correcting element that calculates an amount of correction for correcting a posture of the functional body coordinate system in the world coordinate system estimated from the result of detection by the state detecting element of the state of interaction between the functional body and the structure, on a condition that a magnitude of a deviation of an angle made by the first reference vector and the second reference vector with respect to a reference angle is greater than a threshold value.

According to the control device and the robot including the control device of the present invention, in a case where the magnitude of a deviation of an angle made by two reference vectors with respect to a reference angle is greater than a threshold value, it is highly probable that the state of interaction between the functional body and the structure is divergent from a desired state. Thus, in such a case, the posture of the functional body coordinate system in the world coordinate system, which is estimated from the detection result of the state of interaction between the functional body and the structure, is corrected such that the magnitude of the deviation becomes not greater than the threshold value. With this, an event that an operation of the robot is generated so as to cause the relative position/posture of the body coordinate system to be changed with respect to the functional body coordinate system on the basis of a false recognition result that the state of interaction between the functional body and the structure agrees with the desired state is avoided, and accordingly, the improvement in stability of the operation of the robot is achieved.

BRIEF DESCRIPTION OF THE DRAWINGS

FIG. 6A illustrates a first grasping state of an object by a hand;

FIG. 6B illustrates a second grasping state of an object by a hand;

DESCRIPTION OF THE PREFERRED EMBODIMENTS (Configuration of Robot)

Figure 1:
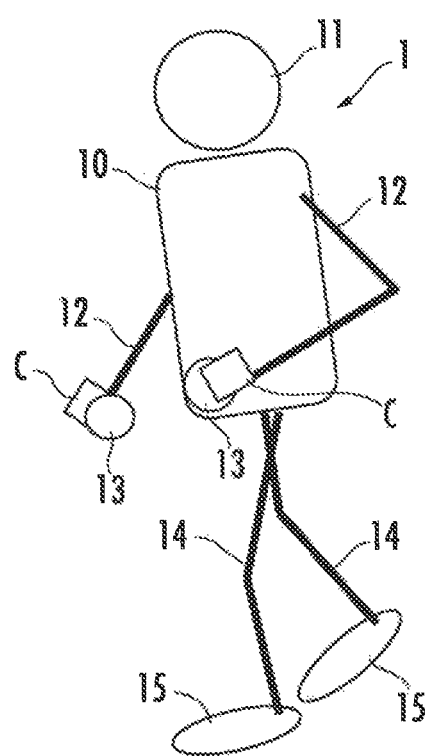
FIG. 1 illustrates a configuration of a robot as an embodiment of the present invention.

A robot 1 as an embodiment of a mobile device of the present invention shown in FIG. 1 is a legged mobile robot. For distinguishing between right and left, reference characters "R" and "L" are used as appropriate. The robot includes, as with a human being, a body 10, a head 11 provided on top of the body 10, right and left arms 12 (first limbs) extended from right and left sides of an upper portion of the body 10, hands 13 (functional bodies) disposed at distal ends of the arms 12, right and left legs 14 (second limbs) extended downward from a lower portion of the body 10, and feet 15 attached to distal ends of the legs 14. The robot 1 is capable of bending and stretching the arms 12 and the legs 14, at a plurality of joint mechanisms corresponding to a plurality of human joints of the shoulder joints, elbow joints, wrist joints, hip joints, knee joints, and ankle joints, by forces transmitted from actuators MOT (see FIG. 2).

An arm 12 includes a first arm link, connected to the body 10 through the intermediary of the shoulder joint mechanism, and a second arm link, having one end connected to an end of the first arm link through the intermediary of the elbow joint mechanism and the other end connected to a base of the hand 13 through the intermediary of the wrist joint mechanism. The shoulder joint mechanism has two degrees of freedom of rotation about the yaw and pitch axes. The elbow joint mechanism has one degree of freedom of rotation about the pitch axis. The wrist joint mechanism has two degrees of freedom of rotation about the roll and pitch axes.

A camera C is fixed to a distal end of each arm 12. A hand 13 includes a palm and one or more finger mechanisms (movable members) which are movable with respect to the palm. The hand 13 is configured to be able to grasp an object in between the palm and one or more finger mechanisms, or in between two or more finger mechanisms, by operations of the finger mechanisms.

A leg 14 includes a first leg link, connected to the body 10 through the intermediary of the hip joint mechanism, and a second leg link, having one end connected to an end of the first leg link through the intermediary of the knee joint mechanism and the other end connected to the foot 15 through the intermediary of the ankle joint mechanism. The hip joint mechanism has three degrees of freedom of rotation about the yaw, pitch, and roll axes. The knee joint mechanism has one degree of freedom of rotation about the pitch axis. The ankle joint mechanism has two degrees of freedom of rotation about the pitch and roll axes. The robot 1 is capable of traveling autonomously with a movement involving the repeated floor-leaving and floor-landing operations of the respective, right and left legs 14.

(Configuration of Control Device)

Figure 2:
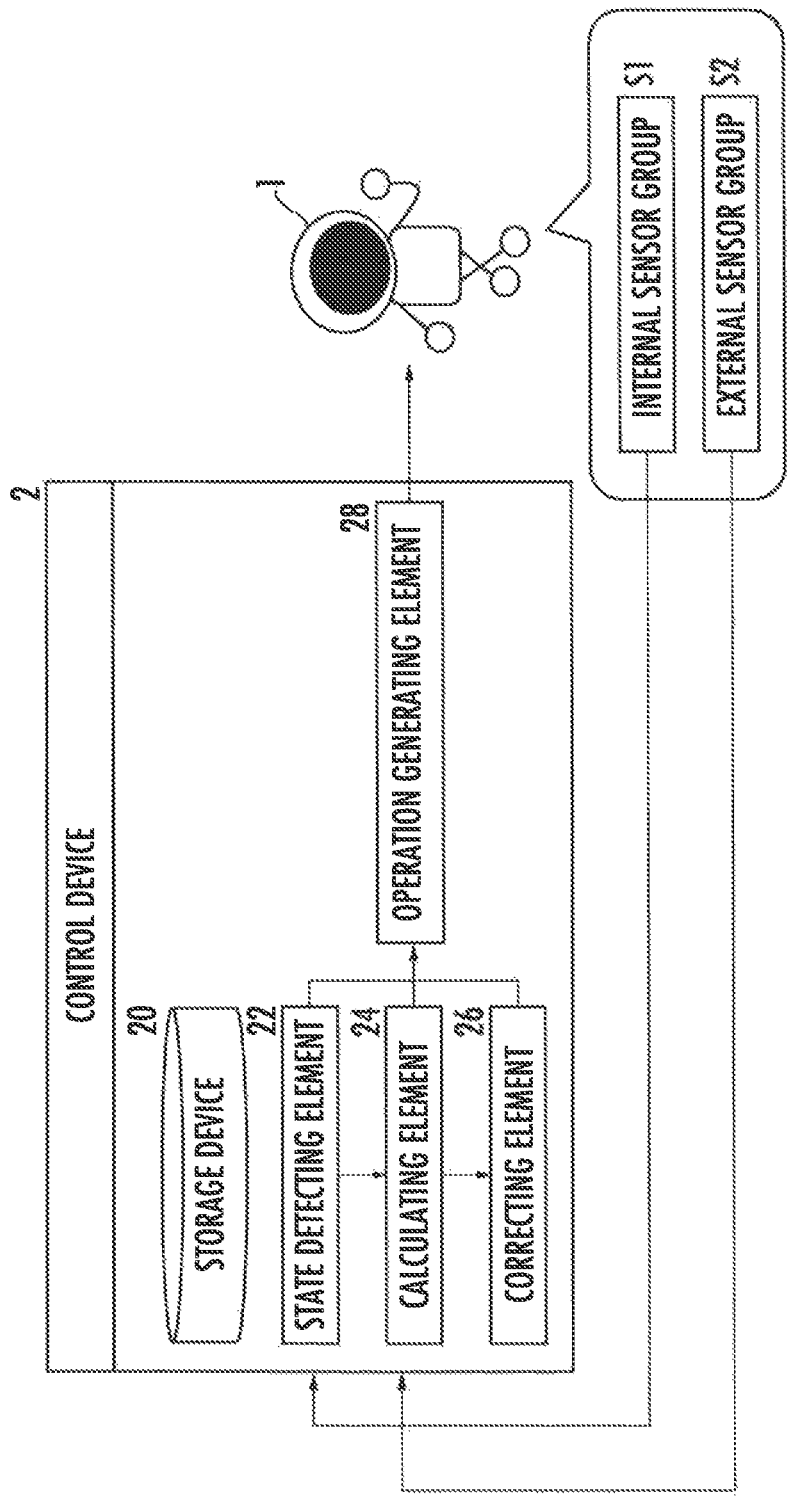
FIG. 2 illustrates a configuration of a control device as an embodiment of the present invention.

The control device 2 shown in FIG 2 is composed of a programmable computer or electronic control unit (composed of CPU, ROM, RAM, I/O circuit, etc.) mounted on the robot 1. The control device 2 is configured to recognize values of various state variables on the basis of output signals from an internal sensor group $S_1$ and an external sensor group and to control the operation of each actuator MOT on the basis of the recognition results.

The internal sensor group $S_1$ includes, besides a GPS measurement device or an acceleration sensor for measuring the position (of the center of gravity) of the robot 1, a gyro sensor for measuring a posture of the body 10, a rotary encoder that measures a joint angle about an axis of a joint mechanism, and a six-axis force sensor that measures an external force acting on a hand 13.

The external sensor group $S_2$ includes, besides the camera C, a motion capture system (not shown) independent of the robot 1, a stereo image sensor mounted on the head 11 for measuring a trajectory of the position of an object such as a ball related to execution of a task, and an active sensor mounted on the body 10 and using infrared light.

The control device 2 includes: a storage device 20, a state detecting element 22, a calculating element 24, a correcting element 26, and an operation generating element 28. The storage device 20 stores information necessary for generating an operation of the robot 1, such as "environmental information" representing a manner in which a structure is arranged in a world coordinate system. The state detecting element 22 detects a state of interaction between a hand 13 and a structure W on the basis of output signals from six-axis force sensors or contact sensors (disposed on the finger mechanisms) included in the internal sensor group $S_1$. The calculating element 24 calculates a first reference vector $U_1$ and a second reference vector $U_2$ which represent how a structure W extends in a camera coordinate system and in a hand coordinate system, respectively, on the basis of a captured image acquired by the camera C. The correcting element 26 calculates an amount of correction for correcting a posture of the hand coordinate system in the world coordinate system, on a condition that the magnitude of a deviation $\Delta\phi$ of an angle $\phi$ made by the first reference vector $U_1$ and the second reference vector $U_2$ with respect to a reference angle $\phi_0$ is greater than a threshold value E. The operation generating element 28 generates an operation or a gait of the robot 1, which includes operations of an arm 12 (first limb) and a hand 13 (functional body) that cause the hand 13 to interact with a structure W and an operation of a leg 14 (second limb) that causes the position/posture of the body 10 to be changed.

A single processor (arithmetic processing unit) may function as the plurality of elements 22 to 28, or a plurality of processors (multicore processors) may cooperate through mutual communications to function as the plurality of elements 22 to 28.

(Functions)

An operation of grasping a structure W such as a handrail with a hand 13 is generated by the operation generating element 28, and the operation of the robot 1 is controlled in accordance with the generated operation. Then, when the hand 13 grasps the structure W, the state of grasping the structure W with the hand 13 (the state of interaction between them) is detected on the basis of the output signals from the six-axis force sensors or contact sensors (disposed on the finger mechanisms $F_1$, $F_2$) included in the internal sensor group $S_1$ (STEP 01 in FIG. 3).

In the case where the output signals indicate a state of equilibrium (when the maximum, average, or accumulated temporal change amount of the output signals is not greater than a judgment value), it is estimated that the state of grasping the structure W with the hand 13 is a desired state shown in FIG. 6A. That is, from the detected result of the state of the hand 13 grasping the structure W, it is guessed that the position and posture of the hand 13 relative to the structure W are in the relation shown in FIG. 6A.

Figure 3:
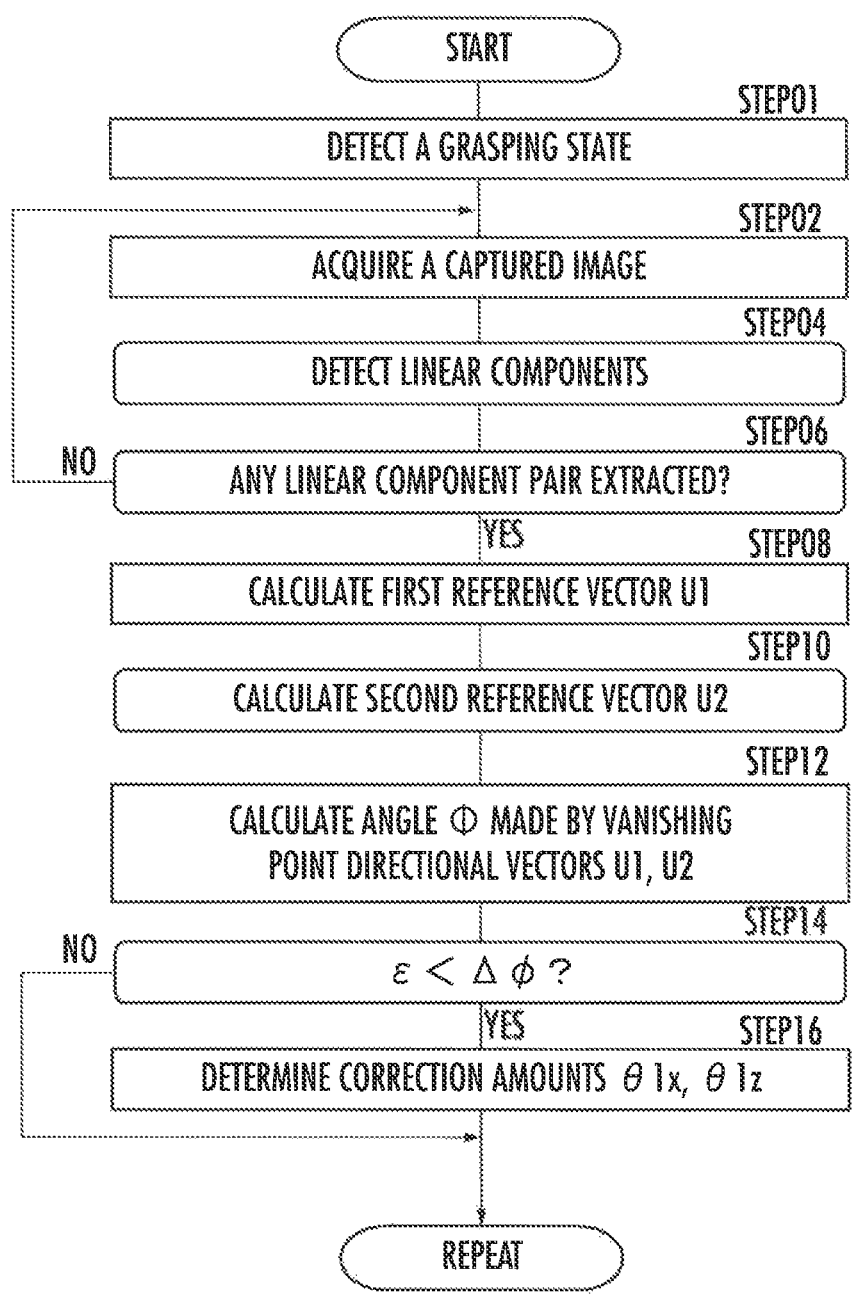
FIG. 3 illustrates a way of correcting the position/posture of a hand.

A captured image is acquired by the camera C included in the external sensor group $S_2$ (STEP 02 in FIG. 3).

Figure 4:
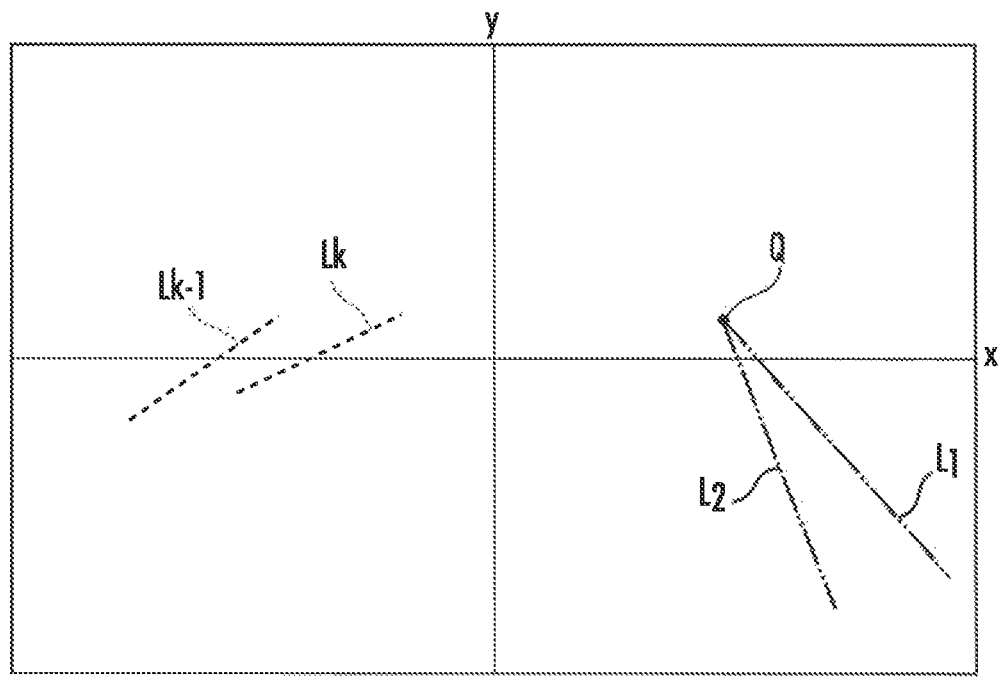
FIG. 4 illustrates a way of extracting linear components and calculating a vanishing point in an image coordinate system.

Edge points are extracted from the captured image (or a gray-scale image generated as the captured image is grayscaled). Then, from the captured image, one or more linear components are extracted, which are each composed of a group of edge points arranged in a straight line (STEP 04 in FIG. 3). An edge point has its position defined by the coordinate values of a pixel that has a physical quantity such as a luminous value changed by an amount greater than a threshold value for an x direction in the image coordinate system (x, y). The linear component is extracted in accordance with a known technique such as the Hough transform. In this manner, as shown in FIG. 4, for example, a plurality of linear components $L_1, L_2, \ldots, L_{k-1}, L_k, \ldots$ are extracted in the image coordinate system (x, y).

In the case where two or more linear components are extracted, the presence or absence of linear component pair(s) is judged (STEP 06 in FIG. 3). In the case where two linear components or their extensions from the respective upper ends intersect each other, the two linear components are extracted as a linear component pair. Here, taking into consideration the arrangement manner of a structure W such as a handrail represented by the environmental information stored in the storage device 20, any linear component having a high probability that it does not correspond to the structure W may be regarded as one that does not constitute a linear component pair. For two linear components $\Sigma_1 = x \cos \theta_1 + y \sin \theta_1$ and $\rho_2 = x \cos \theta_2 + y \sin \theta_2$, the two linear components may be extracted as a linear component pair on conditions that $\Delta\rho(=|\rho_1-\rho_2|)$ is not greater than $\Delta\rho_{th}$ and that $\Delta\theta(=|\theta_1-\theta_2|)$ is not greater than $\Delta\theta_{th}$. "$\Delta\rho_{th}$" and "$\Delta\theta_{th}$" are threshold values which are defined in accordance with the arrangement manner of the structure W (including the size in real space) represented by the environmental information.

If no linear component pair is extracted (NO in STEP 06 in FIG. 3), the processing of acquiring a captured image of a next frame and on are repeated (see STEP 02 in FIG. 3).

On the other hand, if any linear component pair is extracted (YES in STEP 06 in FIG. 3), a first reference vector $U_1$ representing the position of a vanishing point Q in the camera coordinate system $(X_C, Y_C, Z_C)$ with reference to an origin $O_C$ as the optical center of the camera C is calculated (STEP 08 in FIG. 3).

Specifically, the position of point of intersection between the pair of linear components $(\rho_1 = x \cos \theta_1 + y \sin \theta_1$ and $\rho_2 = x \cos \theta_2 + y \sin \theta_2)$ in the image coordinate system is represented as coordinate values $(x_Q, y_Q)$ of the vanishing point Q by the relational expression (01).

$$x_Q = (\rho_2 \sin \theta_1 - \rho_1 \sin \theta_2)/(\sin \theta_1 \cos \theta_2 - \cos \theta_1 \sin \theta_2),$$

$$y_Q = \{(\rho_1 - \cos \theta_1)/\sin \theta_1\} x_q \quad (01).$$

Figure 5:
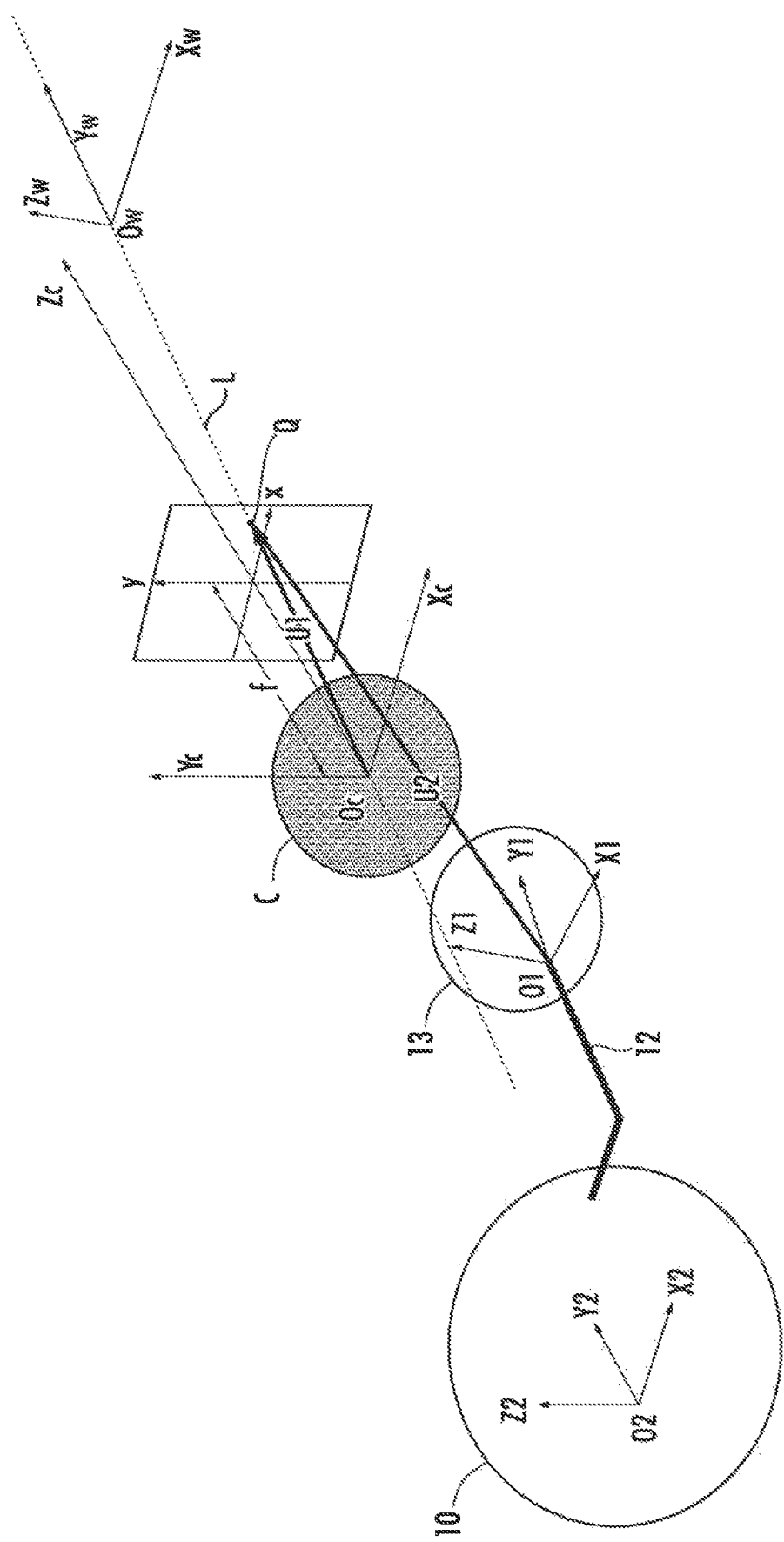
FIG. 5 illustrates a way of calculating reference vectors.

With this, the point Q of intersection of the pair of linear components $L_1$ and $L_2$ is defined, as shown in FIG. 4, for example. The relation among the first reference vector $U_1 = (u_{1X}, u_{1Y}, u_{1Z})$, the focal length f of the camera C, and the vanishing point $Q = (x_Q, y_Q)$ in the image coordinate system (x, y) expressed by the relational expression (02) in accordance with a general perspective projection model (see FIG. 5).

$$x_Q = f(u_{1X}/u_{1Z}), y_Q = f(u_{1Y}/u_{1Z}) \quad (02)$$

Thus, the first reference vector $U_1$ which represents the position of the vanishing point Q in the image coordinate system with reference to the origin $O_C$ of the camera coordinate system is calculated in accordance with the relational expression (03).

$$U_1 = {}^t(x_q, y_q, f) \quad (03)$$

Subsequently, the second reference vector $U_2$ which represents, in the hand coordinate system $(X_1, Y_1, Z_1)$, the position of the vanishing point Q in the image coordinate system is calculated (STEP 10 in FIG. 3). The position and posture of the camera coordinate system with respect to the hand coordinate system are expressed in accordance with the relational expression (04) by using a translational vector T and a rotation matrix R in the world coordinate system. The translational vector T and the rotation matrix R are known from calibration in the manner of attachment of the camera C to the distal end of the arm 12, and are stored in the storage device 20 included in the control device 2.

$$P_C = T + R \cdot P_1 \quad (04).$$

The second reference vector $U_2$ is calculated in accordance with the relational expression (05).

$$U_2 = T + R \cdot P_1 + U_1 \quad (05).$$

Further, an angle $\phi$ made by the first reference vector $U_1$ and the second reference vector $U_2$ is calculated (STEP 12 in FIG. 3). The angle $\phi$ is expressed by the relational expression (06).

$$\phi = \arccos(U_1 \cdot U_2)/|U_1 \cdot U_2|) \quad (06).$$

It is judged whether the magnitude of a deviation $\Delta\phi(=\phi-\phi_0)$ of the angle $\phi$ with respect to a reference angle $\phi_0$ is greater than a threshold value $\varepsilon$ (STEP 14 in FIG. 3). The threshold value $\varepsilon$ is predetermined from the standpoint that, if the magnitude of the deviation $\Delta\phi$ exceeds that threshold value, the operation of the robot 1 may become unstable when the position and posture of the body coordinate system $(X_1, Y_2, Z_2)$ are changed with reference to the hand coordinate system.

If it is judged that the magnitude of the deviation $\Delta\phi$ is not greater than the threshold value a (NO in STEP 14 in FIG. 3), the processing of acquiring a captured image of a next frame and on are repeated (see STEP 02 in FIG. 3).

If it is judged that the magnitude of the deviation $\Delta\phi$ is greater than the threshold value $\varepsilon$ (YES in STEP 14 in FIG. 3), at least one of a pitch rotation angle $\theta_{1x}$ and a yaw rotation angle $\theta_{1z}$ defining a rotation matrix $R_1$ representing the posture of the hand coordinate system in the world coordinate system is determined in such a manner that the magnitude of the deviation $\Delta\phi$ becomes not greater than the threshold value $\varepsilon$ (STEP 16 in FIG. 3).

The posture of the hand coordinate system in the world coordinate system is corrected by that amount of correction. This correction is a concept that encompasses both of the following: that the posture of the hand coordinate system in the world coordinate system is corrected computationally, not accompanied by a change in posture of the hand 13 in the real space; and that the posture of the hand coordinate system in the world coordinate system is corrected computationally and the posture of the hand 13 in the real space is changed so as to conform to the corrected posture of the hand coordinate system in the world coordinate system. Then, with reference to the position and posture of the hand coordinate system in the world coordinate system, an operation of the robot 1, including the desired temporal change manners of the position and posture of the body coordinate system, is generated in accordance with the kinematic model of the robot 1, on the basis of a joint angle of each joint mechanism.

In a state where a relation between the robot 1 and its environment s unknown or in a state where the recognition accuracy thereof is low, when the state of grasping a structure W with a hand 13 (the state of interaction between them) is detected, the "environmental information" representing the position/posture of the structure in the world coordinate system may be corrected by the above-described amount of correction, with reference to the position/posture of the hand coordinate system.

(Effects)

Figure 7A:
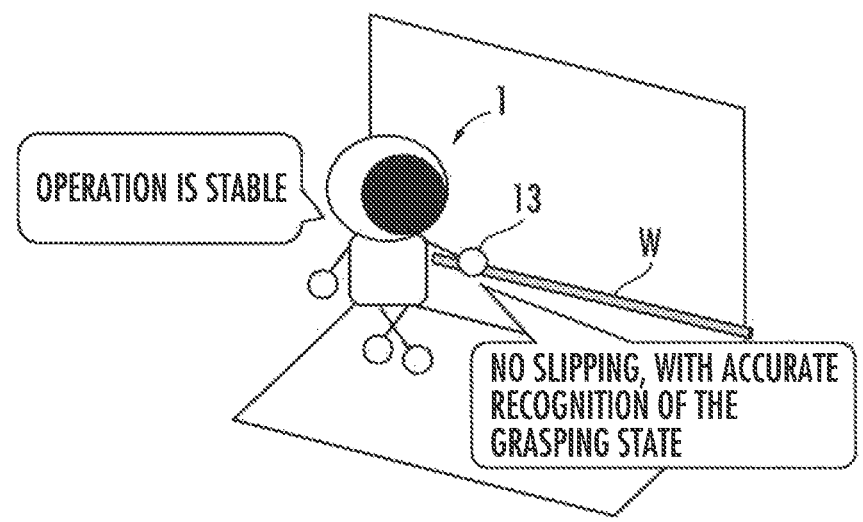
FIG. 7A illustrates a manner of operation of a robot based on the first grasping state.
Figure 7B:
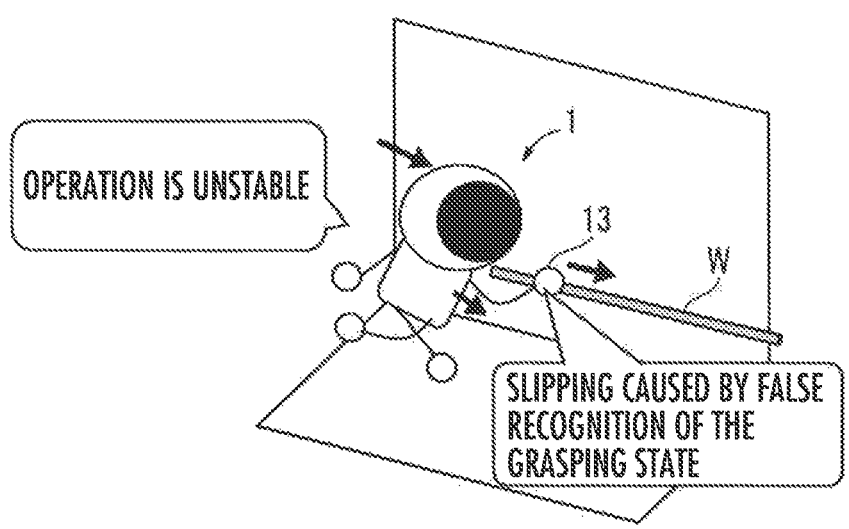
FIG. 7B illustrates a manner of operation of a robot based on the second grasping state.

According to the control device 2 of the robot 1 as an embodiment of the present invention, in a case where the magnitude of the deviation $\Delta\phi$ of the angle $\phi$ (see the relational expression (06)) made by the two reference vectors $U_1$ and $U_2$ with respect to the reference angle $\phi_0$ is greater than the threshold value $\varepsilon$, there is a high probability that the state of interaction between the hand 13 (functional body) and the structure W, detected by the state detecting element 22, is divergent from a desired state (see FIG. 6B). Thus, in such a case, the posture of the hand coordinate system in the world coordinate system is corrected such that the magnitude of the deviation $\Delta\phi$ becomes not greater than the threshold value $\varepsilon$ (see YES in STEP 14 →STEP 16 in FIG. 3). This avoids an event (see FIG. 7B) that the operation of the robot 1 is generated so as to cause the relative position/posture of the body coordinate system to be changed with respect to the hand coordinate system on the basis of a false recognition result that the state of interaction between the hand 13 and the structure W agrees with the desired state. Accordingly, the improvement in stability of the operation of the robot I is achieved (see FIG. 7A).

Other Embodiments of the Invention

In the embodiment described above, the vanishing point Q was defined as the point of intersection of a linear component pair (see FIG. 4). Alternatively, for a linear or curve component for which the probability of representing the extending manner of a structure W in consideration of environmental information (the degree of approximation with the straight line or the curve in the world coordinate system represented by the environmental information) is not lower than a reference value, the point of intersection between that linear or curve component and a line segment corresponding to the horizon may be defined as a vanishing point Q, or still alternatively, an upper end point in the image coordinate system of that linear or curve component may he defined as a vanishing point Q. In a case where there are two or more different linear component pairs which are close to each other or which have a common linear component, the center of gravity of the points of intersection of those linear component pairs may be defined as a vanishing point Q. When calculating that center of gravity, weights may be added to the respective points of intersection, depending on the level of likelihood that the corresponding linear component pair represents the extending manner of the structure W.

What is claimed is:

1. A control device of a robot, the robot including
a body,
a first limb movably connected to the body,
a functional body movably connected to the first limb,
a second limb movably connected to the body, and
an image capturing device having a fixed position and posture relative to the functional body,
the control device comprising:
a storage device that stores environmental information representing a manner in which a structure is arranged in a world coordinate system;
a state detecting element that detects a state of interaction between the functional body and the structure;
a calculating element that calculates, based on a captured image acquired by the image capturing device, a first reference vector and a second reference vector that represent a manner in which the structure extends in an image capturing device coordinate system and in a functional body coordinate system, respectively;
a correcting element that calculates an amount of correction for correcting a posture of the functional body coordinate system in the world coordinate system estimated from a result of detection by the state detecting element of the state of interaction between the functional body and the structure, on a condition that a magnitude of a deviation of an angle made by the first reference vector and the second reference vector with respect to a reference angle, is greater than a threshold value; and
an operation generating element that generates an operation of the robot, the operation including operations of the first limb and the functional body that cause the functional body to interact with the structure, and an operation of the second limb that causes at least one of a position and a posture of the body to be changed.

2. The control device of the robot according to claim 1, wherein the calculating element calculates, from the captured image acquired by the image capturing device, the first reference vector and the second reference vector that represent a position in the image capturing device coordinate system and in the functional body coordinate system, respectively, of a vanishing point which is a point of intersection of a pair of linear components, or extensions thereof, representing the extending manner of the structure.

3. The control device of the robot according to claim 2, wherein the calculating element extracts two linear components as the pair of linear components on a condition that a distance and an angle between the two linear components in the captured image are not greater than respective threshold values defined in accordance with the arrangement manner of the structure represented by the environmental information.

4. A robot comprising:
a body;
a first limb movably connected to the body;
a functional body movably connected to the first limb;
a second limb movably connected to the body;
an image capturing device having a fixed position and posture relative to the functional body; and
a control device, the control device including
a storage device that stores environmental information representing a manner in which a structure is arranged in a world coordinate system,
a state detecting element that detects a state of interaction between the functional body and the structure,
a calculating element that calculates, based on a captured image acquired by the image capturing device, a first reference vector and a second reference vector that represent a manner in which the structure extends in an image capturing device coordinate system and in a functional body coordinate system, respectively,
a correcting element that calculates an amount of correction for correcting a posture of the functional body coordinate system in the world coordinate system estimated from a result of detection by the state detecting element of the state of interaction between the functional body and the structure, on a condition that a magnitude of a deviation of an angle made by the first reference vector and the second reference vector with respect to a reference angle is greater than a threshold value, and an operation generating element that generates an operation of the robot, the operation including operations of the first limb and the functional body that cause the functional body to interact with the structure, and an operation of the second limb that causes at least one of a position and a posture of the body to be changed.

* * * * *